April 6, 1943.  A. ARUTUNOFF  2,315,917
SUBMERGIBLE ELECTRIC MOTOR FOR DEEP WELL PUMPS
Filed Sept. 30, 1937  2 Sheets-Sheet 1
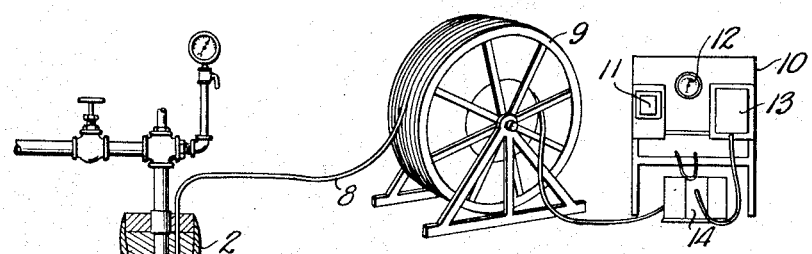
Fig. 1.
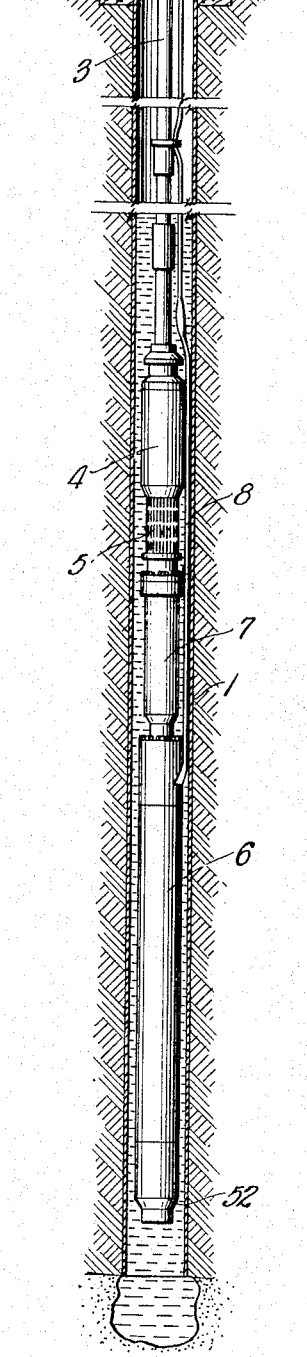
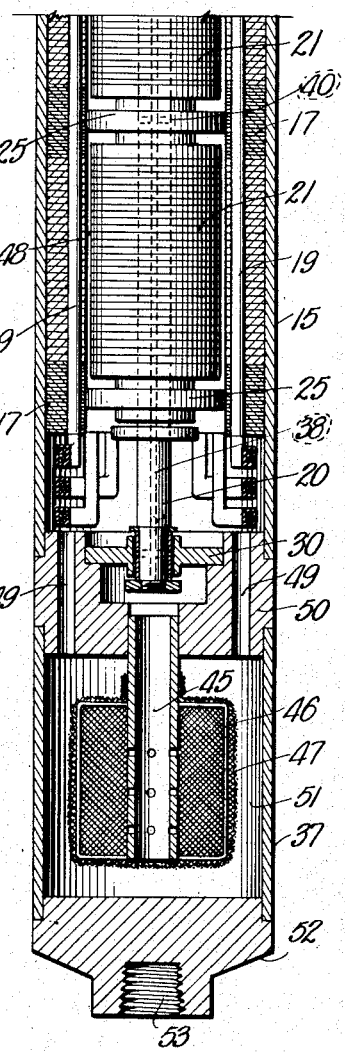
Fig. 2.
Fig. 3.
INVENTOR
Armais Arutunoff
BY Thos. E. Scofield
ATTORNEY April 6, 1943.   A. ARUTUNOFF   2,315,917
SUBMERGIBLE ELECTRIC MOTOR FOR DEEP WELL PUMPS
Filed Sept. 30, 1937   2 Sheets-Sheet 2

INVENTOR
Armais Arutunoff
BY Thos. E. Scofield
ATTORNEY

Patented Apr. 6, 1943

2,315,917

UNITED STATES PATENT OFFICE 2,315,917

SUBMERGIBLE ELECTRIC MOTOR FOR DEEP WELL PUMPS

Armais Arutunoff, Bartlesville, Okla., assignor to Reda Pump Company, Bartlesville, Okla., a corporation of Delaware Application September 30, 1937, Serial No. 166,560

2 Claims. (Cl. 172—36)

My invention relates to submergible electric motors for deep well pumps and more particularly to an electric motor adapted to operate a pump in a single unit positioned at the bottom of a deep well.

A deep well such as an oil well or water well must necessarily be of comparatively small diameter. Most oil wells, for example, are equipped with a well casing having a seven inch diameter. The wells may vary in depth over wide limits, as for example, from 1,000 feet to 7,000 feet or more. The provision of an electric motor for driving a pump positioned within a casing of such small diameter, which pump is adapted to lift oil over a mile, is a difficult problem. We have at the outset the limitation of the external diameter of the motor. The motor having a small external diameter must be able to develop sufficient power to raise the oil, water or brine, depending upon the well in which the pump motor unit is employed. The limitation in the diameter of the motor requires that it be extremely long in order to develop the requisite power. For example, I have built a motor developing 120 horsepower, having an external diameter of 5¼" and having a length of 23 feet. It will be seen that the motor is over fifty times as long as its diameter.

In order that a centrifugal pump be satisfactorily operated, the rotor of the motor must rotate at high speed. The arrangement is positioned at the bottom of a well submerged under a head of fluid. The motor must be such that it will give satisfactory service over a period of time, as considerable labor and expense are involved in positioning the unit at the bottom of the well and attendant lubricating means must be provided, of such nature that proper lubrication of moving parts is achieved. Provision must be made for carrying away the heat of friction. The construction must be such that hysteresis and eddy current losses appearing as heat be reduced to the minimum at the bearings.

One object of my invention is to provide an electric motor construction having a rotor of great length with respect to its diameter in which a novel bearing assembly is provided.

Another object of my invention is to provide an electric motor enabling a small air gap between the rotor and stator to be employed.

Another object of my invention is to provide a novel method of lubricating and cooling the moving parts.

Another object of my invention is to provide a thrust bearing mounting in the head of the motor in such a manner as to provide a sediment chamber.

Other and further objects of my invention will appear from the following description.

In the accompanying drawings which form part of the instant specification and are to be read in conjunction therewith and in which like reference numerals are used to indicate like parts in the various views;

Figure 1 is a diagrammatic view of a cross section of a well provided with a pump unit of my invention.

Figures 2 and 3 are sectional views of the upper and lower portions of a multi-rotor motor, showing one embodiment of my invention.

Figure 4:
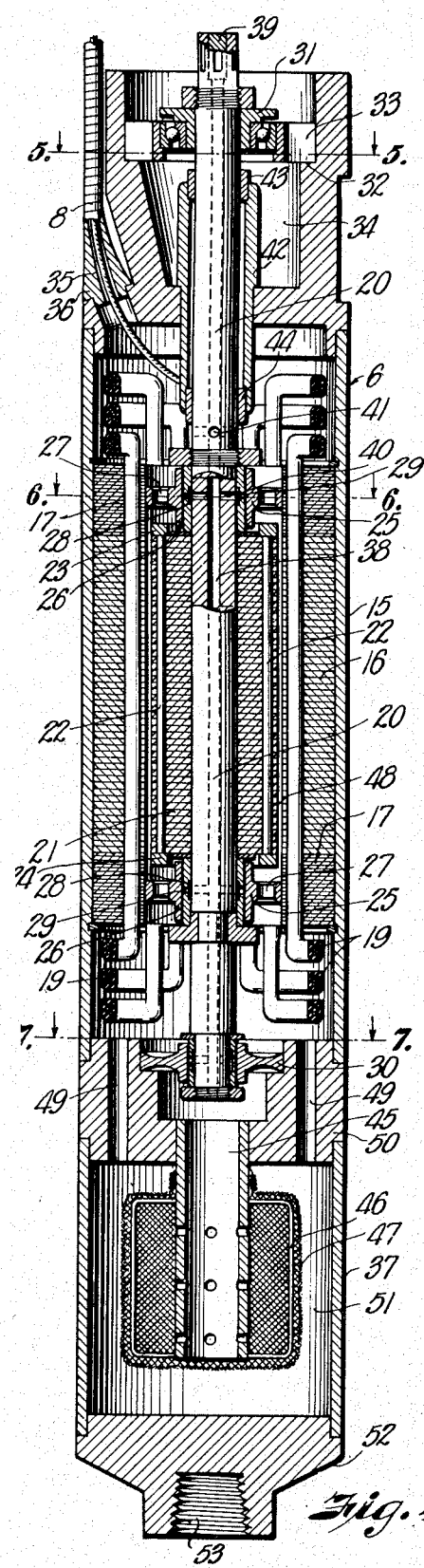
Figure 4 is a sectional view of a single rotor motor, showing an embodiment of my invention.
Figure 5:
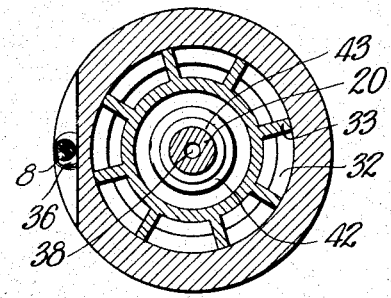
Figure 5 is a sectional view taken on the line 5—5 of Figure 4.
Figure 6:
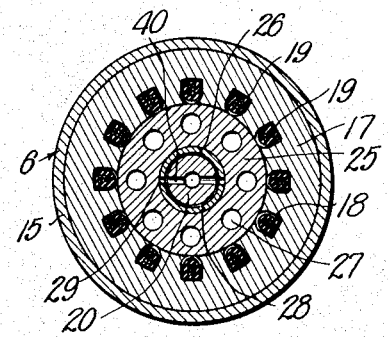
Figure 6 is a sectional view taken on the line 6—6 of Figure 4.
Figure 7:
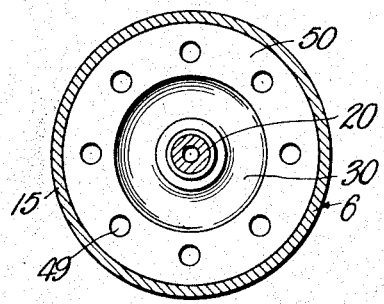
Figure 7 is a sectional view taken on the line 7—7 of Figure 4.

Referring now to Figure 1, the well is provided with a casing 1 which is normally closed by a casing head 2. Eduction tubing 3 for the removal of liquid from the well is provided. The eduction tubing terminates in a pump 4, which may be of any suitable type, as for example a centrifugal pump. Liquid for delivery through the eduction tubing by the pump is taken in through pump screen 5. The motor which drives the pump is housed in housing 6. To prevent fluid from the well finding its way around the motor shaft, a protector unit 7 is provided. The field windings of the motor are energized by power delivered through an electric cable 8 which is normally stored upon cable reel 9. A control panel 10 may contain an entrance switch 11, an ammeter 12, a magnetic switch 13, and the customary fuses, lightning arresters, etc. A transformer 14 is provided, the output of which is impressed upon the motor through the cable 8.

The motor proper comprises an elongated housing 15 in which the stator is assembled. The stator comprises iron laminations 16 and non-magnetic laminations 17. The non-magnetic laminations are provided in the vicinity of the bearings. Due to the use of non-magnetic laminations in the vicinity of the bearings, the heat developed by hysteresis will be reduced. Heat due to friction is developed at the bearings and it is important that other heat adding factors be minimized.

The laminations are provided with reentrant portions 18 which, when aligned, form grooves in which the stator winding 19 is housed. The winding is continuous, that is, it passes through the whole stack of non-magnetic and magnetic laminations from end to end as shown on the drawings. The winding is known to those skilled in the art of alternating current motors and produces a revolving magnetic field which the rotor will follow as is well known in the art.

The rotor is mounted upon a shaft 20 and may comprise laminations 21 through which extend conductors 22, electrically connected at opposite ends by rings 23 and 24, to provide a "squirrel cage" of the induction motor construction. The power factor of the motor is determined in part by the air gap between the pole pieces of the stator and the rotor. For electrical reasons, it is desirable to have the air gap at a minimum. It will be obvious that, if the rotor shaft were supported only at end bearings, the whip in the rotor shaft would allow contact of rotating and stationary parts and would render the arrangement inoperative. It is therefore necessary to support the shaft at intermediate places therealong so as to provide the necessary rigidity to enable a small rotor-stator clearance to be employed. The bearings comprise bearing rings 25, supported by the non-magnetic laminations 17, in which revolve sleeves 26, the sleeve revolving with the shaft 20. The bearing rings 25 may be made of any suitable material, as for example nitrided nitralloy, and are provided with a plurality of holes 27 which serve the double purpose of facilitating the circulation of oil throughout the motor and reducing electrical losses with resultant heat generation. It will be obvious that the bearings are in a revolving magnetic field and the reduction of the amount of metal will reduce losses due to eddy currents which manifest themselves as heat. By providing comparatively large holes, induced currents in the body of the bearings will be of small magnitude.

The sleeves 26 may be made of aluminum bronze and are provided with peripheral grooves 28 and oiling openings 29 to provide for lubrication. The bottom bearing ring 30 is made without the holes inasmuch as it is not within the magnetic field of the stator.

The upper bearing for the rotor shaft comprises a thrust bearing 31 which is supported from shoulder 32 in a sediment chamber 34 by a spider 33. The shaft 20 passes out of the rotor chamber proper through a bushing 42 which supports auxiliary bearings 43 and 44. It will be observed that the upper end of bushing 42 extends a considerable distance into sediment chamber 34 and acts as a standpipe. The conductors in cable 8 pass into the housing 6 through a duct 35, formed in a water-tight fitting 36.

The entire housing may be filled with oil. The lower portion 37 of the housing forms a sediment chamber in which grit, dirt, water and the like may collect. The rotor shaft 20 is provided with a longitudinally extending duct 38. The upper end of the duct is plugged by plug 39. Cross ducts 40 are provided in the region of each of the bearings and a cross duct 41 is provided above the rotor.

The entire motor housing being filled with oil, a column of oil will be present in the duct 38, formed in the shaft 20. Centrifugal force will throw oil out through cross ducts 40 into grooves 28, whence it leaves through oiling openings 29, lubricating the bearing surface between the bearing rings 25 and the bearing sleeves 26. The oil displaced from the duct 41 will cause oil to flow upwardly into the duct 38 from the opening at the bottom of the shaft taking suction from the well 45. The well 45 carries at its bottom end a wire frame 46 around which is supported a fine wire gauze strainer 47. The oil discharged from opening 41 and that escaping from between the bearing rings and the bearing sleeves will flow downwardly through the openings 27 formed in the bearing rings 25. The flow of oil from bearing ring to bearing ring is downwardly through the gap 48 between the rotor and the stator. Passages 49 are provided in the supporting member 50 in which bearing ring 30 rests permitting oil to flow into chamber 51 enclosed by the lower portion of the housing 37. The housing 37 is closed by member 52 which is provided with a threaded socket 53 permitting the attachment of a spacing rod, depth recorder, or any other desired device.

From the foregoing, it will be obvious that circulation of oil from chamber 51, through the duct 38 in shaft 20, out through cross ducts 40 and 41 and back to the chamber 51 will not only lubricate the bearings but will also provide a circulating medium which will tend to cool them dissipating heat from the immediate vicinity of the bearings throughout the entire motor housing.

The motor is connected to the pump proper through a protecting unit 7 which is designed to prevent fluids in the well from finding their way between the bearings and the shaft into the motor housing. Any grit, foreign matter, or water which finds its way into the protector will pass through the openings of the spider 33 into the sediment chamber 34.

It will be observed that I have accomplished the objects of my invention. I have provided a submergible electric motor for deep well pumps of small diameter and great length enabling the use of a high speed rotor by providing a bearing arrangement to keep the long shaft aligned. I have provided a circulating lubricating system which will not only lubricate but distribute the heat at the bearings throughout the entire assembly, preventing the bearings from overheating. I have provided a novel bearing ring in which heat caused by eddy currents and electrical losses is reduced to a minimum. I have provided an electric motor having a long rotor as compared with its width, in which the use of a small air gap between the rotor and stator may be employed.

A motor according to my invention has been installed in a well in Texas in which the estimated ultimate recovery by means of three years of beam pumping was about 100,000 barrels of oil. After thirteen months of pumping, over 325,000 barrels have been recovered. A motor of my invention has had a continuous run of 321 days, driving a pump day and night and pumping over 1,000 barrels a day through a distance of 6,400 feet.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In an electric motor, a vertical housing, a plurality of laminations positioned in said housing, said laminations comprising alternate sections of non-magnetic and magnetic material, bearings supported by said non-magnetic laminations, said bearings including respective annular bearing rings, each bearing ring being provided with a plurality of axially extending openings, bushings journaled in said bearing rings, said bushings being provided with oil holes, a shaft extending through said bushings, said shaft being provided with an axially extending duct, said duct being closed at its upper end and open at its lower end, cross ducts communicating with said axially extending duct at respective bearing bushings, a squirrel cage rotor secured to said shaft, oil in said housing, said housing being formed with a partition adjacent its lower end forming a chamber, an imperforate annular bearing ring supported by said partition, the lower end of said shaft extending through said bearing ring, means providing communication between said axial duct and said chamber, straining means for said communicating means, a duct through said partition, the construction being such that, upon rotation of the rotor, oil will circulate from the axial duct through said cross ducts, through said bushing oil holes, downwardly between the stator and the rotor through said bearing ring openings, through said partition duct into said chamber, through said straining means, through said communicating means to said axial duct.

2. In a submergible electric motor for deep well pumps, a housing formed with an upper recess, said recess having a shoulder, a plurality of laminations in said housing, said laminations comprising groups of magnetic and non-magnetic material, bearing rings supported by said non-magnetic laminations, a shaft journaled in said bearing rings, a squirrel cage rotor secured to said shaft, the upper end of said shaft extending into acid recess, a spider having interstices supported by said shoulder, a bearing for said shaft carried by said spider, a housing for said shaft extending into said recess the construction being such that sediment, grit and foreign matter may pass through the interstices of said spider into said recess.

ARMAIS ARUTUNOFF.